UNITED STATES PATENT OFFICE.

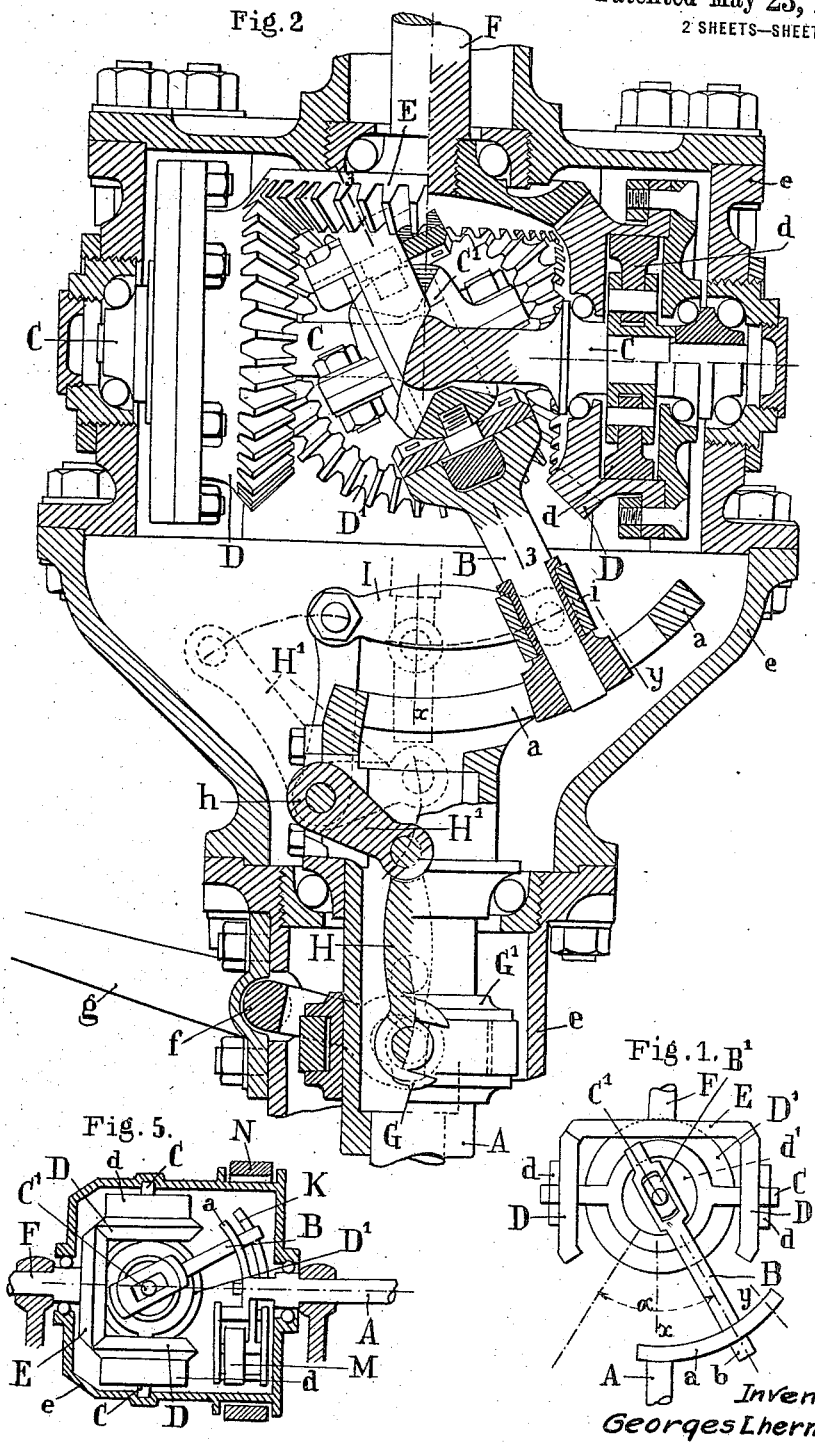

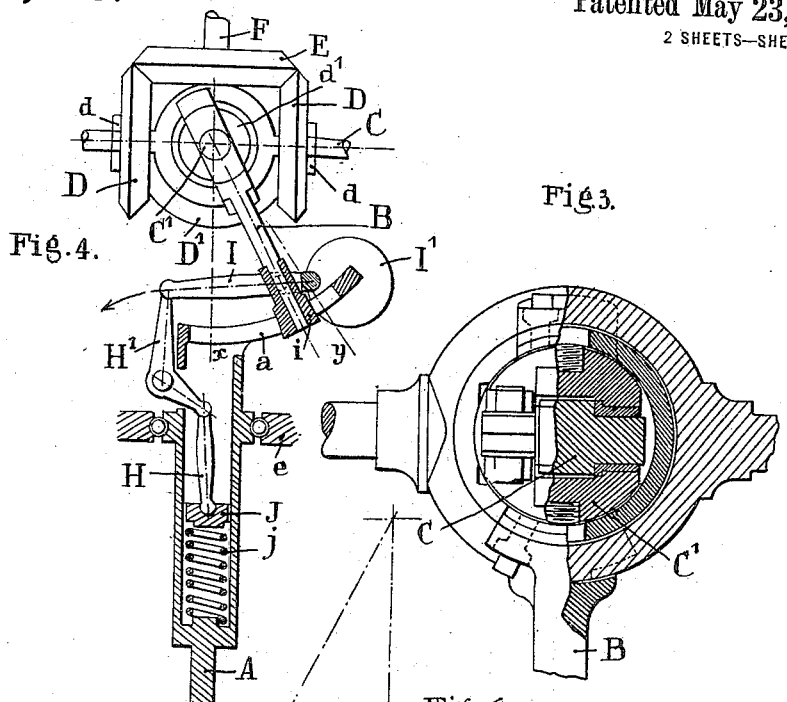
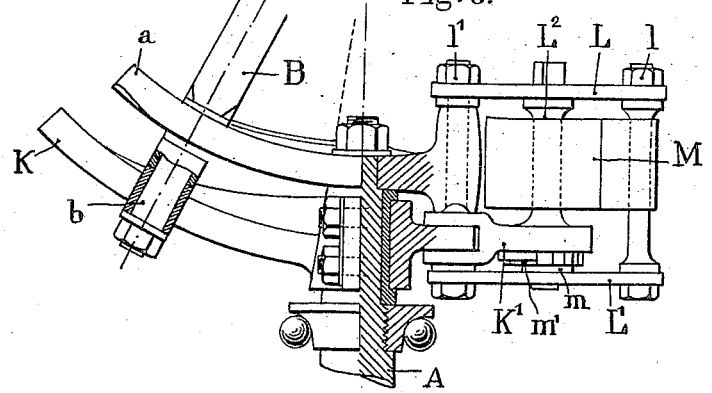
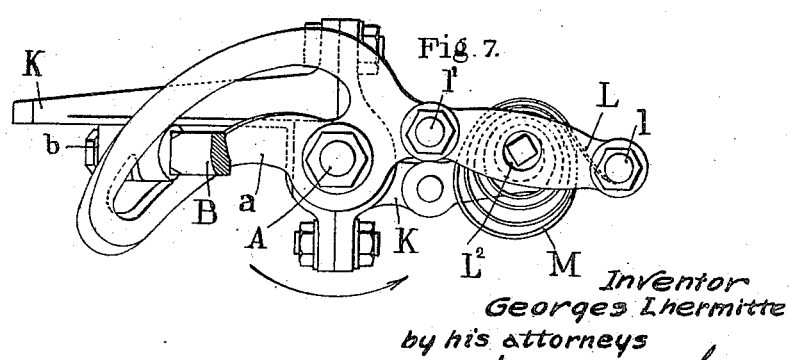

GEORGES LHERMITTE, OF NANTES, FRANCE.

MOTION-TRANSMITTING APPARATUS.

1,417,398.  Specification of Letters Patent.  Patented May 23, 1922.

Application filed September 4, 1920. Serial No. 408,311.

*To all whom it may concern:*

Be it known that I, GEORGES LHERMITTE, a citizen of the Republic of France, residing at Nantes, (Department of the Loire Inferieure,) France, 2 Rue du Bouffay, have invented a new and useful Motion-Transmitting Apparatus, of which the following is a specification.

The present invention has for object an apparatus for transmitting motion from a driving device to a driven device, in which the leverage of the driving couple or torque is variable according to the resistance, and the driving couple itself is constantly proportional to the said resistance. This transmission mechanism is characterised by the fact that the driving device is connected with the driven device by a rod having a conical motion, the operating crank carried by the driving device having a variable throw and the articulation or joint at the apex of the rod being connected by a pawl and ratchet or the like mechanism to the driven device, in such a manner as to transform the alternating motion of this connecting rod into a continuous motion of the driven device.

The displacement of the extremity of the connecting rod along the crank arm can be effected either by hand or by the centrifugal force of a weight to which rotary motion is imparted, or again automatically by an arrangement working independently of the speed of the motor.

The annexed drawings show by way of example, various forms of the transmission apparatus according to the invention.

Figure 1 is a diagrammatic view illustrating the principle of the apparatus. Figure 2 is a longitudinal axial section of the transmission with hand-control for the movement of the connecting rod. Figure 3 is a section on line 3—3 of Figure 2. Figure 4 is a longitudinal axial section of the transmission with centrifugal operation for the movement of the connecting rod. Figure 5 is a diagram of the whole of the transmission device with automatic control. Figure 6 is a part elevation, partly in section, of one form of construction of the automatically controlled transmission. Figure 7 is a corresponding plan view.

Upon the extremity of the shaft A is keyed a crank arm $a$ in the form of a slide which permits the movement of the extremity $b$ of the connecting rod B from the point $x$ (axis of the driving shaft A) up to the point $y$ (extremity of the slide in the crank $a$). The connecting rod B is jointed at its extremity $B^1$ to a secondary shaft C and to another shaft $C^1$ perpendicular to the first in such a way that it can describe a cone of which the apex is at the point of intersection of the secondary shafts C and $C^1$ and of which the generating line is determined by the position of the extremity $b$ of the connecting rod B relatively to the crank $a$. Details of the joint are shown in Figure 3.

When the rod B describes a cone of revolution of which the angle at the apex is for instance equal to it causes each secondary shaft C $C^1$ to describe an alternating movement of rotation of the same angle $\alpha$. To transform this alternating rotary movement into a continuous motion, the pinions D and $D^1$ of the shafts C and $C^1$ respectively are connected with these shafts by pawl and ratchet mechanisms $d$ and $d^1$; the pinions D and $D^1$ are in mesh with a toothed crown or bevel gear E keyed to the end of the shaft F to which the resistance is applied.

The movement of the shaft F will be proportionally slower as the amplitude of movement of the rod B is reduced, that is to say, as its extremity $b$ is brought nearer to the point $x$; in fact, the movement of the shaft F will be nil when the rod B is in the line of prolongation of the driving shaft A.

The form of construction of the transmission apparatus shown in Figure 2, comprises the same parts as those previously described, but it is provided additionally with means for varying by hand the angular position of the rod B. For this purpose, upon the casing $e$ is pivotally attached at $f$ a fork G manipulated by means of a lever $g$; this fork G serves to slide along the shaft A a sleeve $G^1$ which is connected to a rod H, which also is connected to one of the ends of a bell-crank $H^1$ also pivoted on the shaft A at $h$; the other extremity of the bell-crank lever $H^1$ is connected by a link I to a sleeve $i$ mounted upon the rod B. By the sliding movement of the sleeve $G^1$ obtained by manipulating the lever $g$, the rod B can be moved from the position $x$ (indicated in dotted lines) to the extremity $y$ of the slide in the crank $a$ so as to render the said rod stationary in any one of the intermediate positions.

In the example shown in Figure 4, in which the movement of the rod B takes place by the displacement of a weight subjected to centrifugal force, the same parts as in the previous example are shown, with this one difference that the rod H is connected to a piston J subject to the action of a spring $j$ which tends to displace the said piston upwardly, and the link I is extended beyond the sleeve $i$ to receive a weight $I^1$ which revolves at the same time as the shaft A. When at rest the action of the spring $j$ is such that the rod B lies in continuation of the driving shaft A; as soon as the latter commences to turn the weight $I^1$, being subjected to centrifugal force, moves away from the axis $x$ carrying the rod B with it towards the point $y$; if the speed of the shaft diminishes for any reason, for instance, by reason of the increase of the resistance, the action of the spring $j$ predominates and the rod B moves towards the point $x$. Thus a transmission of power is obtained with a leverage proportionate to the rotation of the motor or driving member and at the same time to the resistant force.

The automatic displacement of the rod B along the slide in the crank $a$ can also be obtained by an arrangement working independently of the speed of the motor. The arrangement has been shown in the Figures 5 to 7. The crank $a$, formed by a portion of a sphere, comprises a slide of special shape, the concavity of which is arranged in the direction of rotation of the driving shaft A. The rod B is extended below the crank $a$ so as to contact with an arm K loosely mounted on the shaft A.

Upon the crank $a$ are pivotally attached two links L and $L^1$ connected together by two rods $l$ and $l^1$ and between these two links there is journaled a spindle $L^2$ provided with a square head at its upper end. This spindle serves as a joint for one of the extremities of a rod $K^1$ of which the other end is journaled upon the arm K. A spiral spring M of which one extremity is attached to the rod $l$ and the other to the spindle $L^2$ forms an elastic connection between the crank $a$ and the arm K; a ratchet wheel $m$ keyed upon the spindle $L^2$ and a pawl $m^1$ mounted on the rod $K^1$ permit the spring M to be kept under tension, and the tension of the said spring to be adjusted.

The operation of the apparatus is as follows: The connecting rod B in the position indicated in Fig. 7 may be regarded as in equilibrium between the reaction of the arm K and the component (tangential to the slide and tending to displace the rod B toward the motor shaft A) of the reaction exerted by the rod B on the crank arm slide. When, however, the load increases, the value of the tangential component increases, and its reaction on the arm exceeds that of the arm K, so that the rod B moves toward the shaft A until a condition of equilibrium is again established. On the contrary, when the load decreases, the reaction of the arm K on the rod B becomes preponderant and displaces the rod B away from the shaft A until a condition of equilibrium is again established. Thus, an automatic regulation of the displacement of the rod on the slide is secured, and a crank arm length proportional to the load obtained.

As shown in Figure 5, the whole mechanism which has been described, can be arranged within an enclosed casing $e$ capable of turning around an axis common to the driving and driven shafts A and F, a band brake N being arranged exteriorly of the said casing and designed to hold the same stationary. When the brake N is released, the driving shaft A being in motion and the driven shaft being immobilized, the casing $e$ revolves the pinions D and $D^1$ turning upon the toothed crown E. When, by applying the brake N the rotation of the casing $e$ is stopped, the toothed crown is then rotated and the shaft F rotated.

Thus, by this arrangement it is possible to dispense with clutch between the motor and the shaft to which is applied the resistant force, and to obtain by progressive tightening of the brake a progressive drive of the resistant shaft.

This transmission device, applicable not only to vehicles, but also to machine tools, agricultural machines, lifting apparatus and other machinery, has the advantages of being of small bulk, of working without heating, within a closed casing and of being consequently of high efficiency.

It is obvious that the invention is not limited to the details of construction which have been described; thus for instance, I may form the hinge of the apex of the connecting rod of any suitable mechanical device or vary the number of pinions meshing with the toothed crown gear wheel keyed on the resistant shaft, or again use any suitable driving arrangements and adapt to this transmission device any control device for the movements of the connecting rod.

What I claim is:

1. A motion transmitting apparatus, comprising a rotary driving shaft, a rotatable driven shaft in alignment with the said driving shaft, a crank arm on the said driving shaft, a slot in said crank arm, secondary shafts located at right angles the one to the other in a plane at right angles to the common axis of the driving and driven shafts, a connecting rod guided at one end within the slot of the crank arm of the driving shaft, means respectively fast with the secondary shafts and connected with the rod, at the other end thereof, at the intersection of both secondary shafts, and adapted to transmit from said rod, on rotary motion of the driving shaft, intermittent motions to the said secondary shafts, ratchet means connecting the secondary shafts and the driven shaft and adapted to transform the said intermittent motions of the secondary shafts into a continuous motion of the driven shaft, and means for adjusting the free end of the connecting rod within the slot of the crank arm of the driving shaft.

2. A motion transmitting apparatus, comprising a rotary driving shaft, a rotatable driven shaft in alignment with the said driving shaft, a crank arm on the said driving shaft, a slot in said crank arm, secondary shafts located at right angles the one to the other in a plane at right angles to the common axis of the driving and driven shafts, a connecting rod guided at one end within the slot of the crank arm of the driving shaft, means respectively fast with the secondary shafts, and connected with the rod, at the other end thereof, at the intersection of both secondary shafts, and adapted to transmit from said rod, on rotary motion of the driving shaft, intermittent motions to the said secondary shafts, ratchet means connecting the secondary shafts and the driven shaft and adapted to transform the said intermittent motions of the secondary shafts into a continuous motion of the driven shaft, and means for automatically adjusting the free end of the connecting rod within the slot of the crank arm of the driving shaft.

3. A motion transmitting apparatus, comprising a rotary driving shaft, a rotatable driven shaft in alignment with the said driving shaft, a crank arm on the said driving shaft, a curved slot in said crank arm and the concavity of which is arranged in the direction of rotation of the driving shaft, secondary shafts located at right angles the one to the other in a plane at right angles to the common axis of the driving and driven shafts, a connecting rod guided at one end within the slot of the crank arm of the driving shaft, means respectively fast with the secondary shafts, and connected with the rod, at the other end thereof, at the intersection of both secondary shafts, and adapted to transmit from said rod, on rotary motion of the driving shaft, intermittent motions to the said secondary shafts, ratchet means connecting the secondary shafts and the driven shaft and adapted to transform the said intermittent motions of the secondary shafts into a continuous motion of the driven shaft, a crank lever rotatably mounted on the driving shaft, one arm of said lever bearing on the connecting rod, a spring acting on the other arm and adapted to force the first arm against the connecting rod and to move said rod within the slot of the crank arm, into the direction of rotation of the driving shaft.

4. In the motion transmitting apparatus specified in claim 3, means for regulating the tension of the spring acting on the crank lever and on the connecting rod.

In testimony whereof I have signed my name to this specification.

GEORGES LHERMITTE.

Witnesses:
HOWARD E. TAGGAR,
R. LAPETTY.